(12) United States Patent
Walter et al.

(10) Patent No.: US 6,582,148 B1
(45) Date of Patent: Jun. 24, 2003

(54) ELASTIC SHAFT COUPLING HAVING A TORSION ELEMENT

(75) Inventors: Jürgen Walter, Haltern (DE); Ulrich Falz, Dortmund (DE)

(73) Assignee: Hackforth GmbH, Herne (DE)

( * ) Notice: Subject to any disclaimer, the term of this patent is extended or adjusted under 35 U.S.C. 154(b) by 0 days.

(21) Appl. No.: 09/807,454

(22) PCT Filed: Oct. 6, 1999

(86) PCT No.: PCT/EP99/07447

§ 371 (c)(1),
(2), (4) Date: Jul. 5, 2001

(87) PCT Pub. No.: WO00/22313

PCT Pub. Date: Apr. 20, 2000

(30) Foreign Application Priority Data

Oct. 12, 1998 (DE) .......................................... 198 46 873

(51) Int. Cl.⁷ ................................................ F16D 3/64
(52) U.S. Cl. ........................ 403/220; 403/228; 464/17; 464/92
(58) Field of Search ............................... 403/221, 220, 403/222, 227, 228; 464/17, 87, 92, 98, 99, 903

(56) References Cited

U.S. PATENT DOCUMENTS

| | | | | |
|---|---|---|---|---|
| 4,380,442 A | * | 4/1983 | Amsel ........................ | 464/87 X |
| 4,563,166 A | * | 1/1986 | Walter et al. .............. | 464/92 X |
| 4,708,514 A | * | 11/1987 | Walter et al. .............. | 464/92 X |
| 4,929,115 A | * | 5/1990 | Lunke et al. ................ | 403/228 |
| 5,066,263 A | * | 11/1991 | Lunke et al. .............. | 464/99 X |
| 5,429,552 A | * | 7/1995 | Scherner et al. ............... | 464/17 |
| 6,234,903 B1 | * | 5/2001 | Walter et al. ................. | 464/17 |
| 6,361,443 B1 | * | 3/2002 | Walter et al. ................. | 464/92 |

FOREIGN PATENT DOCUMENTS

| | | | | |
|---|---|---|---|---|
| AT | 154034 | | 3/1938 | |
| DE | 3310695 | | 9/1984 | |
| DE | 3327825 | * | 2/1985 | .................. 464/98 |
| DE | 3710390 | | 10/1988 | |

* cited by examiner

Primary Examiner—Lynne H. Browne
Assistant Examiner—David E. Bochna
(74) Attorney, Agent, or Firm—Collard & Roe, P.C.

(57) ABSTRACT

The invention relates to an elastic shaft coupling having at least one torsion element (1) which comprises at least one elastomer body (5) serving as a transmission element. Axial metallic connecting flanges (2) are mounted in a fixed manner, preferably by vulcanization, on the input and output sides of the elastomer body. In order to increase the transmittable power density and to improve the rubber-metal connection in the edge areas of the connecting flanges (2), the invention provides that the connecting flanges (2) axially project outward with regard to the elastomer body (5) from the plane of the connecting flange while forming an arch at least on the radially extending edges (2a, 3a) of the connecting flanges between the elastomer body (5) and the connecting flanges (2), the edges being formed on the outer edges of connecting flange segments (2) and/or on the inner edges of passages (3) in the connecting flange (2). In addition, the elastomer body (5) is connected to the flanges by vulcanization along the arched area.

9 Claims, 5 Drawing Sheets

ELASTIC SHAFT COUPLING HAVING A TORSION ELEMENT

CROSS REFERENCE TO RELATED APPLICATIONS

Applicants claim priority under 35 U.S.C. §119 of German Application No. 198 46 873.3, filed on Oct. 12, 1998. Applicants also claim priority under 35 U.S.C. §120 of PCT/EP99/07447, filed on Oct. 6 1999. The international application under PCT article 21(2) was not published in English.

BACKGROUND

The present invention relates to an elastic shaft coupling comprising at least one torsion element having at least one elastomer body serving as a transmission element. Axial metallic connecting flanges are mounted in a fixed manner on said elastomer body on the input and output sides particularly by vulcanization In conjunction with such shaft couplings comprising torsion elements, the torque is exclusively transmitted via one or a plurality of elastomer bodies, which, as a rule, are high-quality coupling rubber bodies. Metallic connecting flanges in the form of disks are undetachably mounted on the axial face sides of the one or more rubber bodies for introducing the torque into said rubber body or bodies. The best joint is currently produced by vulcanization.

Under dynamic load, i.e. in the transmission of torques that are variable in terms of time, as they are present, for example due to torque peaks in large diesel engines with low flywheel mass, the transmission elements are subjected to torsion that is variable in terms of time as well. Due to such dynamic load, heat loss occurs in the course of deformation of the elastomer body as a result of internal friction. Since the stressability of elastomer materials even with the highest operational efficiency decreases with the rise in temperature, efficient measures are employed for cooling, i.e. for dissipating heat from the rubber body.

For cooling the core areas of the rubber bodies, which require special attention in light of the fact that elastomer materials basically have a relatively low specific thermal conductivity, it is already known since a long time to employ instead of a ring-shaped, through-extending elastomer transmission element a plurality of segment-shaped torsion elements having connecting flange segments. Such a torsion element is known, for example from DE 37 10 390 C2.

It is also known already from said DE 7 10 390 C2 to provide both one-piece, ring-shaped and segment-shaped torsion elements with axial breakthroughs extending axially through the connecting flanges, and the elastomer body with axial venting channels.

The cooling air, which flows in between the segments or through the breakthroughs in the connecting flanges, provides in an advantageous manner for effective air cooling of the rubber bodies, so that it was possible to substantially increase the power density of such torsion elements. This, however, leads to particularly high loads acting on the elastomer/metal joint, i.e. the active vulcanized area of the rubber body on the connecting flange. Particularly endangered with respect to the formation of cracks in the rubber, or initial tearing of the elastomer/metal joint, are the edges of the connection area on the radial outer edges of the connection flange segments, or on the inner edges of breakthroughs, i.e. of venting openings in the connecting flanges.

For the purpose of preventing the formation of cracks and detachment in the marginal zones or on the edges of the rubber/metal joint, it has already been proposed in AT 154 034 to round off the edges and to design the rubber body in such a way that it extends around the face sides of the edges. A further development of said basic idea is specified in DE 33 10 695 C2. Said document relates to torsion elements where the radial face edges of the connecting flange segments are provided with a rounded-off profiling, around which the rubber body is drawn.

The measures according to the prior.art explained above offer the advantage that the adhesion of the rubber body to the edge of the rubber/metal connection area is enhanced. Another positive effect is that the axial width of the rubber body in said marginal zones and thus the active elastic length are increased. However, in light of the fact that the requirements that have to be satisfied with respect to power density are constantly increasing, the limits of the measures specified above have just about been reached in the meantime, because it has been found that under maximum load, bending stresses are exerted on the projecting area of the rubber body in spite of the curved profiling of the edges. Furthermore, the active elastic length within the zone of the radial faces of the segments or in the cross section of the breakthroughs in the connecting flange can be increased only by the axial thickness of the material of the connecting flanges. This defines stress limits which, until the present time, cannot be exceeded.

SUMMARY

Now, the problem on which the present invention is based is to further develop torsion elements of the type specified above in that higher transmittable power densities become possible. Such optimization takes into account particularly the special stress occurring within the area of the faces of connection flange segments and along the edges of the breakthroughs in the connecting flanges.

For solving said problem, the invention proposes that at least along the radially extending edges of the connecting flanges in the area where the elastomer body and the connecting flanges are joined, said edges being formed are along the outer edges of the connecting flange segments, and/or on the inner edges of breakthroughs in the connecting flange, the connecting flanges axially project outwards from the plane of the connecting flange with respect to the elastomer body; and that the elastomer body is joined with the flanges along the arched area by vulcanization.

According to the invention, the connecting flanges are bent axially outwards in those locations where the free edges of the rubber/metal connection interface extend radially and are consequently exposed to special loads. This applies in particular to the inner edges of breakthroughs, i.e. of venting openings provided in the connecting flange, or, in conjunction with segmented connecting flanges, to the radial outer edges of the connecting flange segments. Owing to the outwardly projecting edge zone as defined by the invention, the area where the rubber and the metal are joined by vulcanization is widened in the axial direction beyond the axial width of the connecting flange.

For practically implementing the design as defined by the invention, it is possible also to bend the plate-like connecting flanges axially outwards along the edges, or, as an alternative, to form an axially outwards projecting bead along the edges by molding. The last-mentioned embodiment is particularly advantageous if the connecting flanges or the connecting flange segments are manufactured from cast steel.

An important advantage of the invention lies in the fact that on the one hand, the area of adhesion, i.e. the area of vulcanization within the edge zone, is enlarged irrespective of the thickness of the material of the connecting flanges in the axial direction. The force by which the rubber body is held on the connecting flange is absolutely increased, on the one hand. On the other hand, the bending stress caused by the greater radius of the curvature of the projecting or curved edges is substantially reduced vis-à-vis the relatively narrow edge zones found in the prior art, which optimizes the introduction of force into the rubber body.

Another advantageous effect of the invention is that the active elastic length of the rubber body between the edge zones projecting as defined by the invention is substantially increased, to a degree higher than it would basically be possible in the prior art. In the prior art, the rubber body theoretically can be widened only by the axial thickness of the material of the connecting flanges, whereas this limitation is overcome in conjunction with the invention because the edges of the projecting edge zones can be readily bent outwards by multiple times the amount of such axial thickness, which naturally leads to a widening within said area correspondingly. This translates into a decrease in the stress values maximally occurring during operation. In cooperation with the enlarged area of adhesion as defined by the invention and explained above, a substantial increase of the power density is achievable.

The embodiment as defined by the invention is equally applicable to the design of the radial edges of connecting flange segments as well within the breakthrough arranged in the connecting flanges. In connection with the breakthroughs, this is possible irrespectively of whether they are filled with rubber material, or whether such breakthroughs are adjoined by venting channels in the rubber body.

In a preferred embodiment of the invention, the torsion element has venting openings axially extending through the connecting flanges and the elastomer body. The interior of the elastomer body is effectively cooled by air flowing through the axial venting channels adjoining the axial breakthroughs in the connecting flange. Owing to the fact that the venting openings are arranged within breakthroughs provided as defined by the invention, i.e. provided with projecting or beaded edges, enhanced adhesion is obtained in the edge zones of the rubber/metal joint located there as well.

According to a further development of the invention, provision is made that the elastomer body has radial venting channels. This makes it possible, furthermore, that the radial venting channels can be connected with the aforementioned axial venting channels. In this way, the torsion elements are structured in the way of a radial compressor. During rotation, ambient air is aspirated via the axial openings due to centrifugal forces, and discharged into the outside by way of the radial venting channels across the periphery of the elastomer elements. The constant flow of air results in particularly effective cooling.

The radial venting channels are usefully open radially outwards. This means that they can be closed radially inwards. Active rubber material therefore remains standing in the interior for transmitting the torque.

In conjunction with embodiments having radial venting openings, it is particularly advantageous if the connecting flanges have breakthroughs located within the peripheral zone between said radial venting openings. Such breakthroughs do not change into venting channels but are filled with rubber material. By virtue of the embodiment as defined by the invention, comprising edge zones that are axially projecting outwards, the elastic length is increased within the zone of the breakthroughs, on the one hand, and additional adhesion and stability of the rubber body between the radial venting channels are made available on the other.

BRIEF DESCRIPTION OF THE DRAWINGS

Other objects and features of the present invention will become apparent from the following detailed desription considered in connection with the accompanying drawings. It is to be understood, however, that the drawings are designed as an illustration only and not as a definition of the limits of the invention.

In the drawings, wherein similar reference characters denot similar elements throughout the several views.

DETAILED DESCRIPTION

Figure 1:
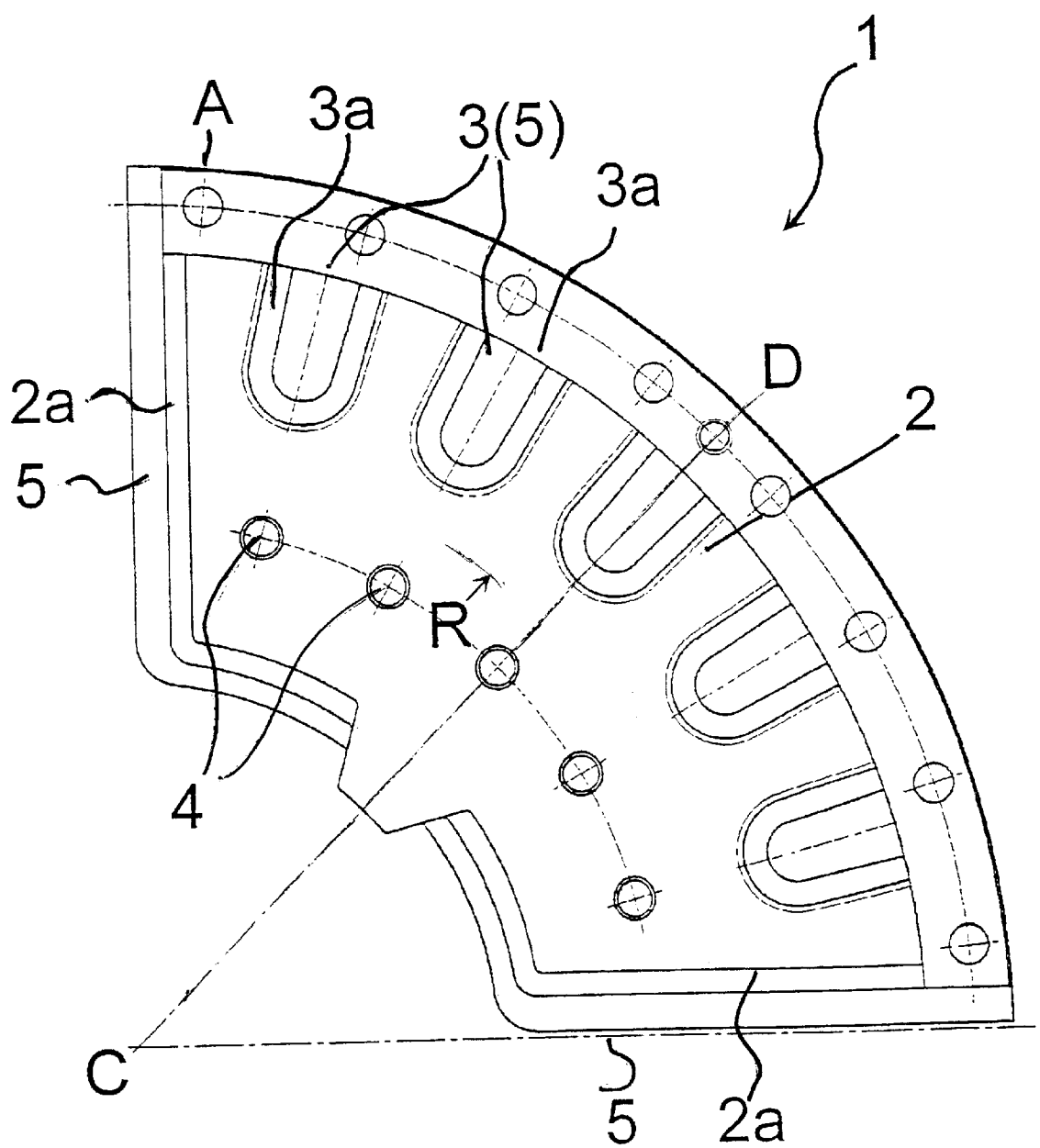
FIG. 1 is an axial view of a torsion element segment as defined by the invention.

FIG. 1 shows an axial view of a segment-shaped torsion element as defined by the invention, which is denoted in FIG. 1 by reference numeral 1. Said view substantially shows an axial top view of one of the two consecutively arranged, equally structured, quarter circle-shaped connecting flange segments 2.

In a complete shaft coupling, a total of four of the shown torsion elements 1 are assembled in such a way that the circular connection flange segments 2 form a connecting flange that has a circular shape overall. Between the radial edges of the connecting flange segments 2, the connecting flanges on the input and output sides each have consequently a total of four breakthroughs.

In the radial edge zones 2a of the connecting flange segments 2, the connecting flange 2 as defined by the invention is projecting outwards, thus in the present case in the direction of the viewer, i.e. it is bent or beaded up along the edge zone 2a.

Furthermore, the connecting flange segment 2 has a total of five breakthroughs 3, which are through-extending and have an about U-shaped contour. Said breakthroughs are bent or beaded upwards in the direction of the viewer like the aforementioned edge zones 2a as well.

The circular, axially through-extending venting openings 4 are located on a graduated circle disposed on the inside. Said venting openings may be provided with edge zones projecting as defined by the invention as well, which, however, has not been realized in the embodiment shown.

Reference numeral 5 denotes a rubber body serving as the transmission element. Said rubber body is joined with the successive connecting flange segments 2 by vulcanization. Said rubber body 5 is segment-shaped as well and, in the present representation, is covered for the most part by the connecting flange segment 2. The rubber body is visible only in the areas drawn around over the edge zones, as well as through the breakthroughs 3, which is indicated by the reference numeral (5) set in brackets. The venting openings 4 axially penetrate the rubber body 5 as well.

Figure 2:
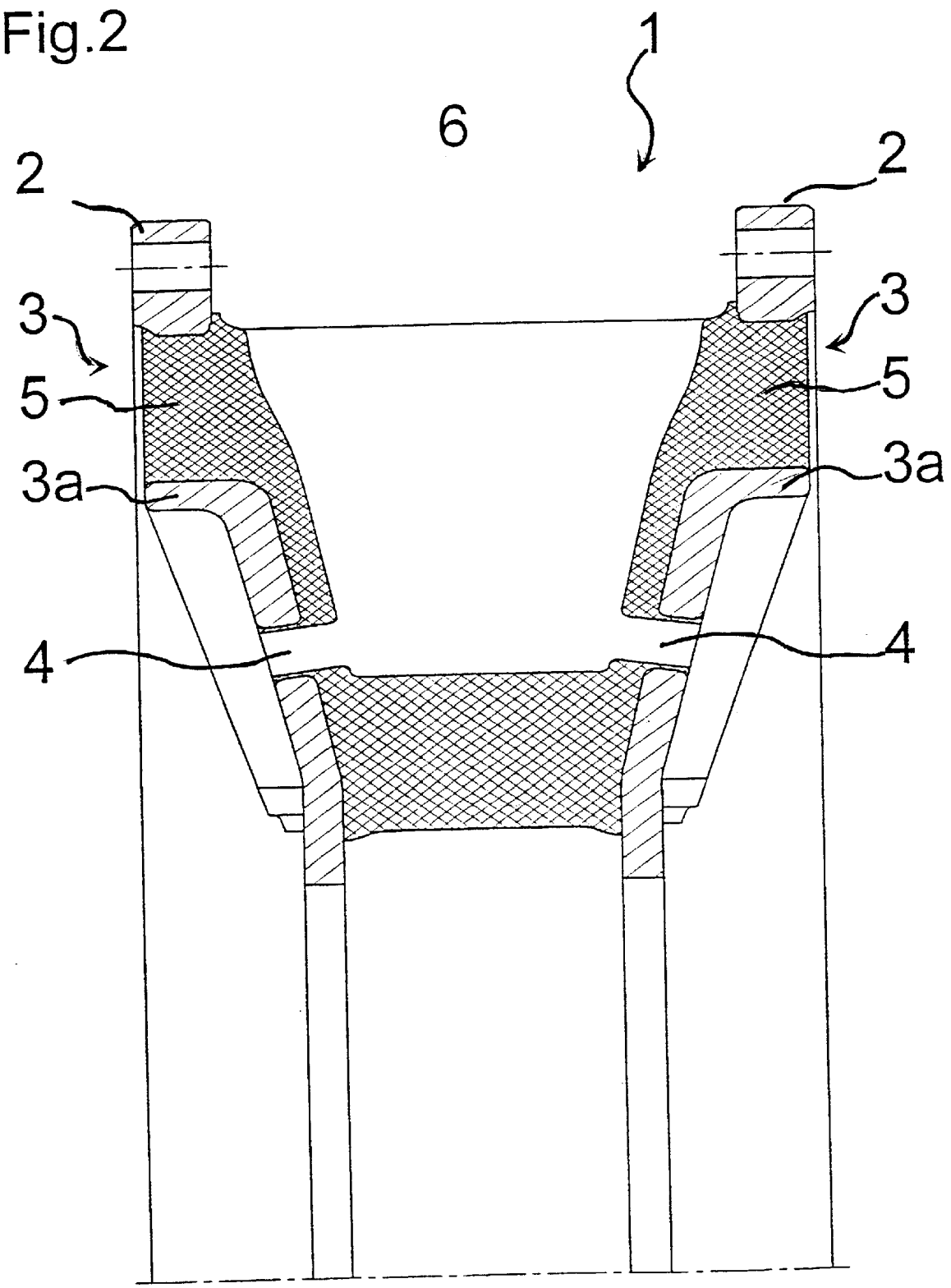
FIG. 2 shows a radial section C-D according to FIG. 1.

FIG. 2 shows a radial section through the torsion element 1 according to FIG. 1. Identical components are denoted by the same reference numerals as in FIG. 1.

It is particularly obvious from FIG. 2 how the edges 3a of the breakthroughs 3 are projecting outwards or are bent up. The rubber body 5, which fills the breakthroughs 3, follows the outwardly projecting area and is fixed there on the connecting flange segment 2 by vulcanization as well.

Said representation also shows that the venting openings 4 feed into the radial venting channels 6 in the rubber body 5, which are open only outwards toward the periphery and closed toward the inside.

Figure 3:
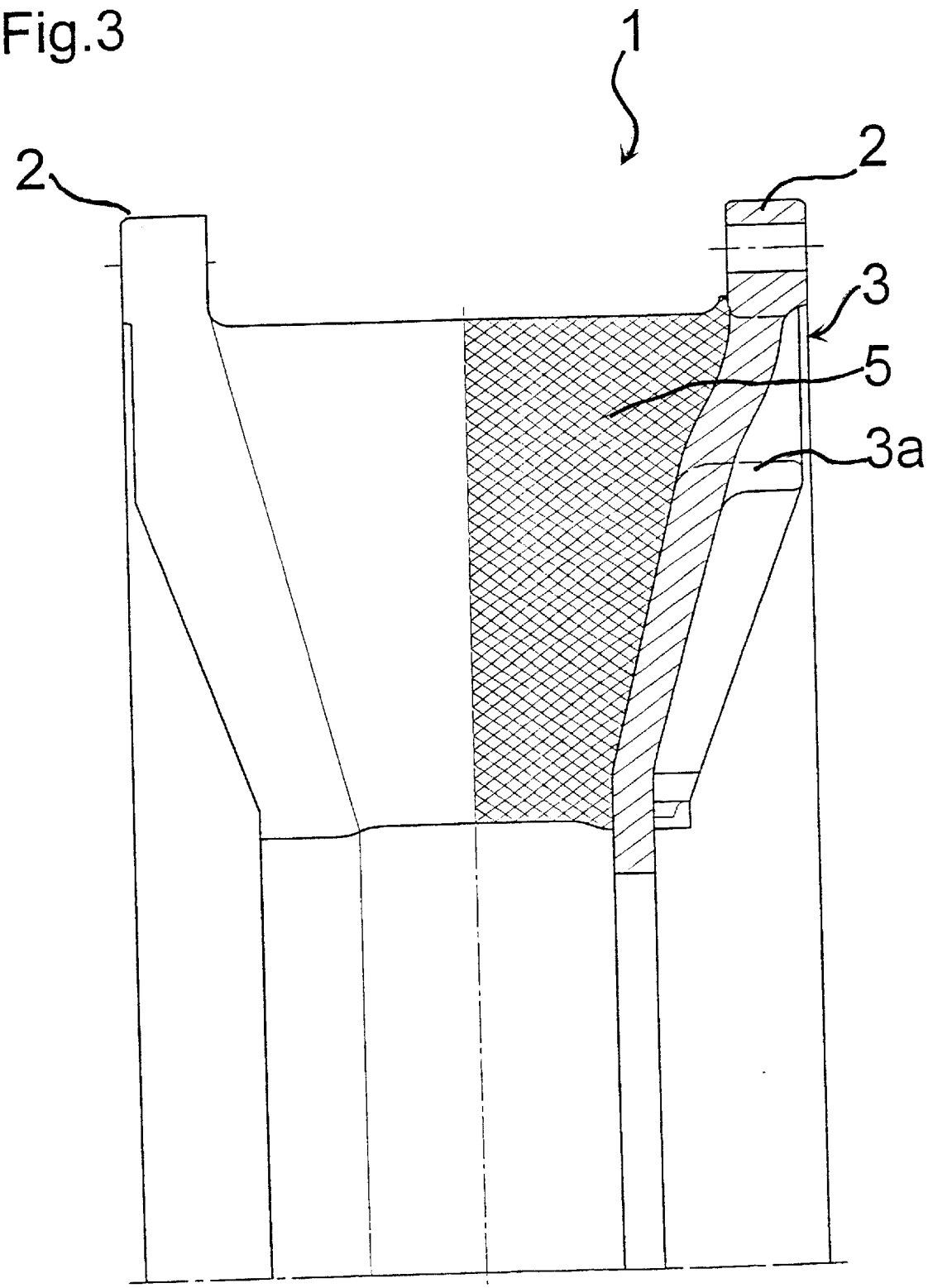
FIG. 3 shows a radial half section C-A according to FIG. 1.

FIG. 3 shows a half section in the same representation as in FIG. 2; however, said half section is disposed in the peripheral area between the breakthroughs 3. In the representation in FIG. 3, the edges 3a, which are projecting outwards like a collar, are visibly indicated as well.

Figure 4:
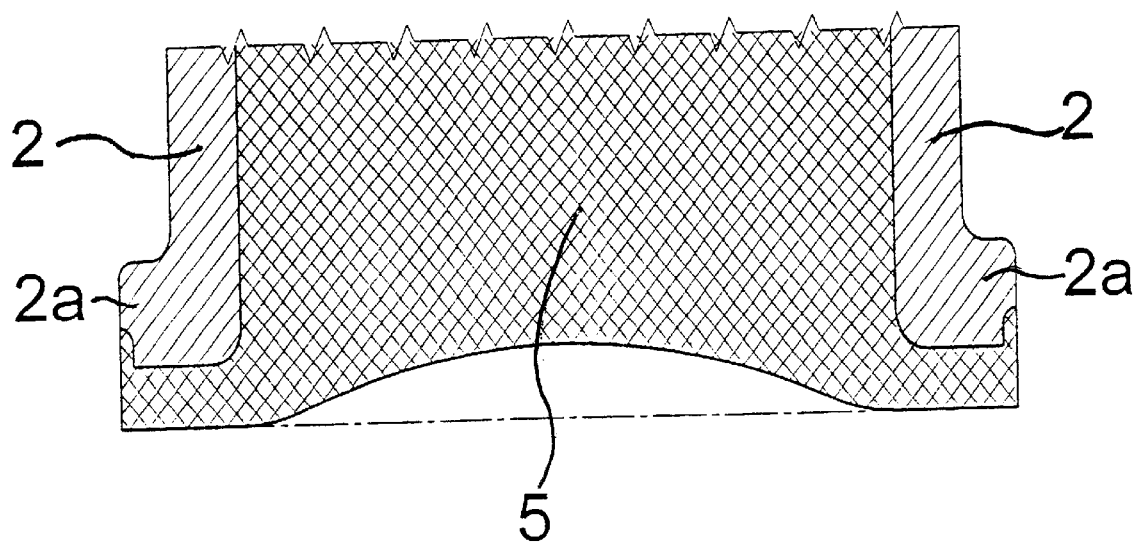
FIG. 4 is a partial view of a section in the peripheral direction according to FIG. 1 within the reference radius R.

FIG. 4 shows a partial view of a section in the peripheral direction in the reference radius R through the radial edge zones 2a of the connecting flange segment 2. This shows with special clarity how the connecting flange segment 2 is axially projecting outwards or bent up from the plane of the connecting flange in the edge zone 2a. The rubber body 5 extends around said edge zones 2a in the peripheral direction. In the present case, the bent-up areas 2a could be referred to also as bead-like moldings.

It becomes obvious from FIG. 4 that compared with the inner zone, which is disposed between the inner sides of the connecting flange segments 2, the effective elastic length of the rubber body 22 is distinctly increased in the marginal area 2a.

Figure 5:
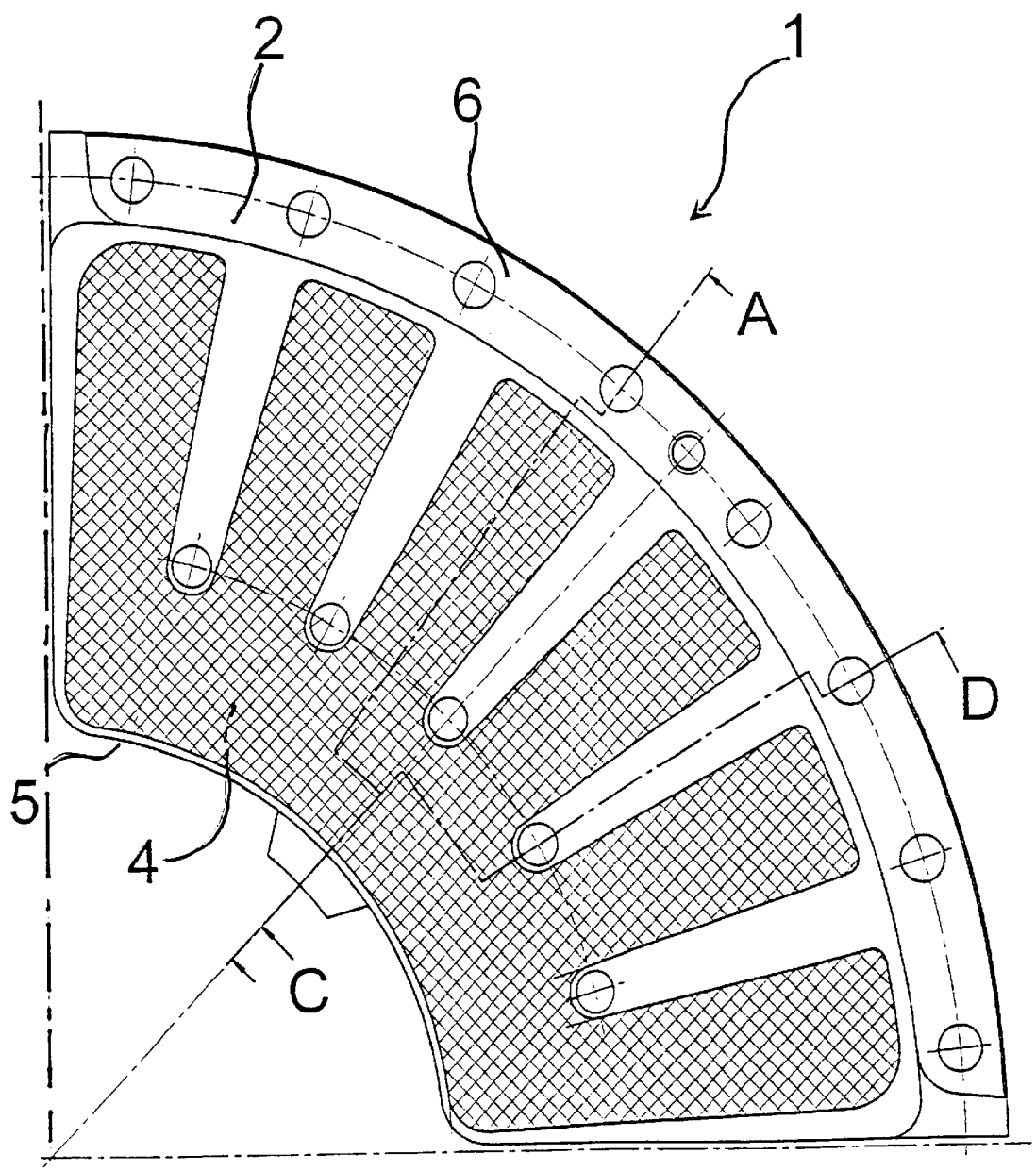
FIG. 5 shows an axial section through the torsion element segment according to FIG. 1.

FIG. 5 shows an axial section through the torsion element 1 according to FIG. 1 by the same view, which shows the arrangement of the individual functional elements with special clarity.

Figure 6:
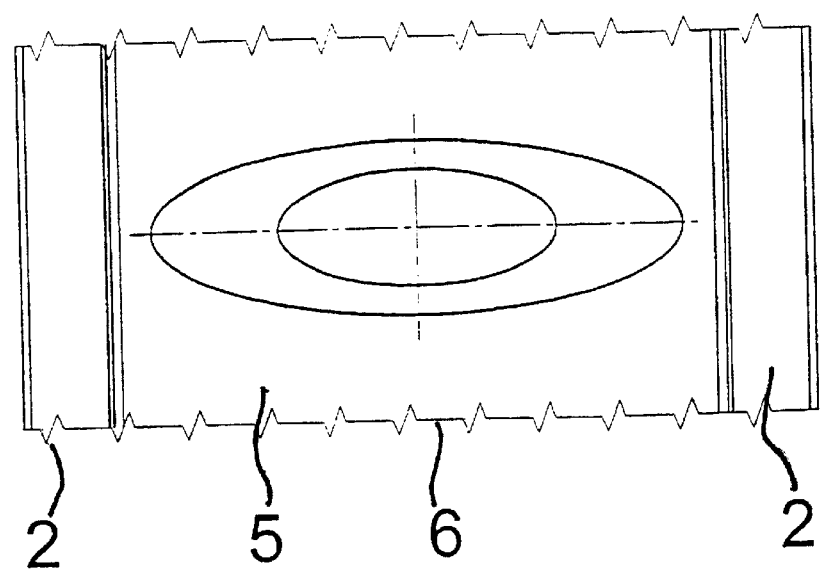
FIG. 6 is a radial partial view from the outside.

FIG. 6 shows a radial view of the venting channels 6 from the outside. Their oval cross section, which is narrowing radially inwards, can be clearly recognized in said view.

The advantages according to the invention consist in that the rubber body 5, owing to the outwardly bent up or beaded up edges 2a and 3a, has the greater active vulcanization area there, as if the butt edges were only cut off there in a plane manner as it is the case in the prior art. The elastic length, i.e. the axial width of the rubber body 5, is effectively increased in said areas as well. This means that the relative stresses attacking on the rubber-metal transition area are additionally reduced.

This means that the joint of the rubber body 5 with the. connecting flange segment 2 can be stressed to a particularly high degree both in the radial face areas of the torsion element 1 and in the breakthroughs 3. The risk of detachment or formation of cracks is thus substantially reduced. This permits in increase in the transmittable power density.

Effective cooling of the rubber body 5 is ensured on account of the fact that because of the centrifugal forces occurring during rotation, cool air is aspirated through the axial venting openings 4 and radially discharged to the outside through the radial venting channels 6.

The increase in the elastic length effectively obtained within the zone of the breakthroughs 3 provides the shaft coupling with optimal properties of elasticity.

Accordingly, while only a few embodiments of the present invention have been shown and described, it is obvious that many changes and modifications may be made thereunto without departing from the spirit and scope of the invention.

What is claimed is:

1. An elastic shaft coupling comprising at least one torsion element serving as a transmission element, each torsion element comprising:

at least one elastomer body;

at least one axial metallic connecting flange mounted in a fixed manner via vulcanization on input and output sides of said at least one elastomer body and said at least one connecting flange having radially extending edges; and a plurality of breakthroughs that extend through said at least one connecting flange, wherein said plurality of breakthroughs have inner edges;

wherein said radially extending edges and said inner edges of said plurality of breakthroughs project axially outward in a curved manner from a plane of said at least one connecting flange with respect to said at least one elastomer body; and wherein said at least one elastomer body is connected to said at least one connecting flange along said outwardly curved edge regions of said at least one connecting flange.

2. The shaft coupling according to claim 1, wherein said inner edges of said plurality of breakthroughs and said radially extending edges of said at least one connecting flange have beads pointing up.

3. The shaft coupling according to claim 1, wherein a bead axially projecting beyond the outer surface of said at least one connecting flange is shaped by molding along said inner edges of said plurality of breakthroughs and said radially extending edges of said at least one connecting flange.

4. The shaft coupling according to claim 1, wherein each torsion element further comprises axial venting openings that extend through said at least one connecting flange and said at least one elastomer body.

5. The shaft coupling according to claim 4, wherein said axial venting openings are disposed within said plurality breakthroughs.

6. The shaft coupling according to claim 1, wherein said at least one elastomer body comprises radial venting channels.

7. The shaft coupling according to claim 6, wherein said radial venting channels open radially outwards.

8. The shaft coupling according to claim 6, wherein said plurality of breakthroughs are disposed peripherally between said radial venting channels.

9. The shaft coupling according to claim 6, wherein said radial venting channels and said axial venting openings of said at least one elastomer body are connected with each other.

* * * * *